United States Patent [19]

Moore

[11] Patent Number: 5,147,912

[45] Date of Patent: Sep. 15, 1992

[54] METHOD OF PREPARING FIRE RETARDANT THERMOPLASTIC GRANULES

[75] Inventor: William P. Moore, Hopewell, Va.

[73] Assignee: FR Polymers, Inc., Disputanta, Va.

[21] Appl. No.: 763,527

[22] Filed: Sep. 23, 1991

[51] Int. Cl.$^5$ .......................... C08J 3/12; C08K 5/34; C08L 23/04

[52] U.S. Cl. ..................................... 524/101; 524/86; 524/140

[58] Field of Search .......................... 524/86, 101, 140

[56] References Cited

U.S. PATENT DOCUMENTS

| | | | |
|---|---|---|---|
| 4,001,177 | 1/1977 | Tsutsami | 260/78 S |
| 4,317,766 | 3/1982 | Kawasaki et al. | 524/101 |
| 4,321,189 | 3/1982 | Ohshita et al. | 524/101 |
| 4,363,890 | 12/1982 | Ohshita et al. | 524/101 |

Primary Examiner—Paul R. Michl
Assistant Examiner—U. K. Rajguru

[57] ABSTRACT

A two step method of preparing fire retardant thermoplastic polymer granules from fire retarding agents and thermoplastic polymers in a stationary granulating cylinder containing mixing elements mounted to a central rotating shaft which fluidizes and throws contained materials toward the center of the cylinder, forcing axial and radial flows simultaneously on the materials thereby forming granules. In the first step, a fire retarding agent is mixed with a fluid thermoplastic polymer at a temperature exceeding the solidification point of the polymer until a homogeneous mixture is formed. In the second stage, the mixture is solidified by cooling while the granulating cylinder continues to operate until the fire retardant agent is bound together in homogeneous granular form by a matrix of solid thermoplastic polymer. Suitable fire retarding agents include alumina, phosphates, borates, melamine, melamine cyanurate, metal cyanurates, and halogenated phenols. The fluid thermoplastic polymer may be a metal or aqueous dispersions. Suitable polymers include polyolefins, polyphenyls, polyamides, polyfluocarbons, polycarbonates, polyurethanes, polyesters, and polyvinylidene chloride. The method allows preparation of thermoplastic granules, suitable for melt blending with other polymers, containing as much as 90 percent fire retardant agent. The fire retardant thermoplastic concentrate granule compositions prepared by this method are new and exhibit better physical properties at high active ingredient concentrations than compositions available heretofore. These new concentrated fire retardent compositions have improved properties of melt blending with other thermoplastics to impart fire retardency thereto.

15 Claims, No Drawings

METHOD OF PREPARING FIRE RETARDANT THERMOPLASTIC GRANULES

CROSS REFERENCES TO RELATED APPLICATIONS invention is related to my copending U.S. Patent Application entitled Cyanurate Based Fire Retardant Concentrates filed herewith.

FIELD OF THE INVENTION

The present invention is directed to the field of fire retardant thermoplastics. It is directed more particularly to a two step method of preparing fire retardant granules for thermoplastic polymers in a mechanically fluidized stationary cylinder. In the first step, a fire retarding agent is mixed with a fluid thermoplastic polymer at a temperature exceeding the polymer solidification temperature to form a homogeneous mixture; and in the second step, the mixture is solidified into homogeneous granular form by cooling while operation of the fluidizing granule forming cylinder is continued. The present invention provides an improved and economically practical method of preparing new homogeneous fire retardant compositions containing higher concentrations of fire retardant agents than heretofore possible, and which are highly resistant to burning. These granules may be readily used as fire retardant concentrates for effectively melt blending with other thermoplastic polymers and plastics to impart fire retardancy thereto.

BACKGROUND OF THE INVENTION

It is known that the flammability of polymers and plastics may be reduced by the addition of fire retarding agents. It is also known that these fire retarding agents may be mixed with thermoplastic polymers in concentrated forms, sometimes called master batches, for mixing with other thermoplastic polymers and plastics to impart fire retardancy.

A large number of substances have shown properties of retarding fire and reducing flammability of thermoplastics, and some are appropriately used as fire retarding agents in thermoplastic polymers and plastics. These fire retarding agents are usually solids exhibiting several of the following properties: high melting or sublimation points, endothermic degradations, resistance to attrition, and intumescence.

These fire retarding agents may be blended directly with thermoplastic polymers in a conventional dry blender such as a V-type blender. The fire retarding agents are usually available as powders, but the thermoplastic polymers are normally available as extrusions or chips. Powders and extrusions are difficult to blend and impossible to keep and use in a homogeneous condition.

The fire retarding agents may be melt blended by mixing in a mass of molten thermoplastic resin, and then discharged to be broken up into appropriately sized solid particles. The normal method for breaking up the particles consists of extruding molten material through a die, and cooling the extruded die strans until they solidify. The solidified strans are then chopped into desired lengths. The method most widely used continuously feeds the fire retarding agent in powder form to a twin screw melt blender along with the thermoplastic polymer. Although the method produces satisfactory fire retardants, it has several severe drawbacks and limitations.

Screw type melt blenders are expensive and the wear on the screws from feeding powders of fire retarding agents is substantial, costly, and requires periodic shut-downs to repair, rework, or replace blender screws and barrels worn by the abrasive fire retardant powders.

In either of the aforementioned methods of preparing fire retardants for thermoplastics, concentrates of fire retarding agent in thermoplastic polymers may be prepared which may be in turn melt blended with other thermoplastic polymers and plastics to impart fire retardancy thereto. However, such a practice is strongly limited by the relatively low concentrations which may be prepared, the lack of homogeneity, the poor mechanical properties of the concentrated fire retardants prepared, and poor or impossible mechanical operations at high fire retarding agent concentrations.

Another problem of the prior art methods of preparing thermoplastic fire retardant particles, is that the thermoplastic polymers used in the methods must be substantially free of water or low boiling solvents. If more than a trace of moisture is added to, or contained by, the thermoplastic polymer in the methods of the prior art, the apparatus must be equipped with special vents or the fire retardant particles produced will contain foam caused by the liquids evaporating in the melt blender.

The use of a screw type melt blender in producing fire retarding thermoplastic resins is demonstrated by Tsutsami in U.S. Pat. No. 4,001,177, where he was able to produce a flame retarding composition containing between 3 and 40 percent melamine and between 0.5 and 20 percent isocyanuric acid. In U.S. Pat. Nos. 4,321,189 and 4,363,890, Oshita and Tsutsami advanced the art further in producing a flame retardant melamine cyanurate in nylon. However, they were limited to a maximum fire retarding agent concentration of about 30 percent, and higher concentrations downgraded the mechanical properties of the nylon.

OBJECTS OF THE INVENTION

A primary object of this invention is to overcome the problems cited in the prior art by providing a new method by which fire retarding agents may be effectively incorporated into fire retardant thermoplastic polymer granules.

A further primary object of the invention is to provide a method of producing fire retardant thermoplastic polymer granules in an economical procedure exhibiting low wear and maintenance on blending equipment.

A further primary object of the invention is to provide a method of producing fire retardant thermoplastic polymer granules exhibiting good physical properties and containing higher concentrations of fire retarding agents than heretofore practical.

A further primary object of the invention is to provide a method of preparing homogeneous fire retardant thermoplastic polymer granules.

A further primary object of the invention is to provide new and economical thermoplastic polymer fire retardant granular compositions containing higher concentrations of fire retarding agents than heretofore practical.

A further primary object of the invention is to provide a homogeneous thermoplastic polymer fire retardant concentrate for effective melt blending with other thermoplastic polymers and plastics to impart fire retardancy thereto.

SUMMARY OF THE INVENTION

The present invention provides a two-step method of preparing fire retardant granules for thermoplastic polymers and plastics by mixing a fire retarding agent with a fluid thermoplastic polymer at a temperature exceeding its solidification temperature until a homogeneous mixture is formed and then solidifying the fluid mixture by cooling to a temperature less than the solidification point of the thermoplastic polymer until the fire retardant agent is bound together as homogeneous granules by a matrix of solid thermoplastic polymer.

I have discovered that the foregoing method may be carried out with improved effectiveness in a stationary granulating cylinder containing mixing elements, mounted to a central shaft rotating along the center line of the cylinder, which throw materials contained in the cylinder away from its wall and toward the center of the cylinder, forcing axial and radial flows simultaneously on the contained materials, thereby forming granules. It was also discovered that the granulating cylinder must also be equipped with one or more chopping blades on a shaft mounted through and perpendicular to the cylinder wall to control size of the granules formed. It was found necessary that the mixing elements and the choppers be operated during both steps of the two step process.

DESCRIPTION OF THE PRESENTLY PREFERRED EMBODIMENT

The present invention is directed to an improved method of preparing granular fire retardants for thermoplastic polymers and plastics and to the concentrated fire retardant granules prepared by this method. The method homogeneously combines fire retarding agents in high concentrations with lesser amounts of thermoplastic polymers in mixing and solidification steps to form fire retardant granules in a mechanically fluidized cylinder.

In the two-step method of preparing fire retardant thermoplastic polymer granules from fire retarding agents and thermoplastic polymers, it was discovered that a horizontal stationary granulating cylinder could be effectively used if it contained mixing elements mounted to a central shaft which rotates along the center line of the cylinder and which mixing elements mechanically fluidize materials contained in the cylinder by throwing them away from the cylinder wall and toward the center of the cylinder, forcing axial and radial flows simultaneously on the contained materials. These mechanical actions were found to form granules. It was further found that for the granulating cylinder to be effective, it must be equipped with one, or more, chopping blades operating on a shaft mounted through and perpendicular to the side wall of the cylinder to control particle size of granules formed in the method.

In the first of the two steps, a fire retarding agent is mixed in the granulating cylinder with a fluid thermoplastic polymer at a temperature exceeding the solidification temperature of the polymer until a homogeneous fluid mixture of fire retarding agent and thermoplastic polymer is formed.

Then in the second step, the fluid mixture of fire retarding agent and thermoplastic polymer is solidified by cooling to a temperature less than the solidification temperature of the thermoplastic polymer. This solidification is carried out while the mixing elements and the chopping blades of the granulating cylinder are continued in operation until the fire retardant agent is bound together in homogeneous granules by a matrix of solid thermoplastic polymers.

The physical properties of fire retarding agents which may be used in the present invention may differ widely so long as they may be effectively mixed with the thermoplastic polymers. They may be liquids or melts which are solidified by chemical reactions in the granulating cylinder. They also may be solutions or dispersions which are solidified by evaporation of the liquid. Usually the fire retarding agents are finely divided solids which may be readily dispersed throughout the thermoplastic polymer. I have found that these finely divided solids are most effective when they have particle diameters between 1 and 50 microns. Particles with less than 1 micron diameters were difficult to handle and formed clumps in the solids handling and feeding equipment, while particles with more than 50 microns diameter were less effective and caused requirements for more than the optimum amount of fire retarding agent.

The s-triazine compounds were found to work especially well in the method of this invention because of their ready dispersibility, and the integrity of the high concentration fire retarding granules formed therefrom. Salts of alkali and alkaline earth metals were also effective fire retarding agents. These compounds found to be effective include phosphates, borates, polyphosphates, silicates, and combinations thereof.

The instant method surprisingly is effective with fire retardant agent concentrations between 5 and 90 percent of the total weight of the fire retardant granules. At concentrations above 90 percent, the integrity of the granules was reduced to the point that they were powdery and increased wear on machines melt blending them. Concentrations below 5 percent were not high enough to cause most thermoplastic polymers and plastics to rate zero on Underwriters Laboratories 94L Test and be rated non-burning.

A variety of thermoplastic polymers may be used effectively in the present invention, particularly if their solidification temperatures are between 90° and 240° C. Where the solidification temperatures are lower than 90° C., the products tend to store poorly and the granules agglomerate. Solidification temperatures above 240° C. sometimes cause polymer degradation during the granule forming of the present invention and are undesirable. Thermoplastic polymers found to function well as fluid thermoplastic polymers in the present method include: polyolefins, polyphenyls, polyamides, polyfluocarbons, polycarbonates, polyurethanes, polyethers, polyesters, and polyvinylidene chloride.

Aqueous dispersions of thermoplastic polymers were found to be particularly effective fluid thermoplastic polymers for the present invention. These dispersions fit the method and provided excellent economics and physical operating conditions when they contained between 15 and 60 percent thermoplastic polymer and had a solidification temperature less than 60° C.

The present invention was effective using the aqueous dispersions only when the water was removed from them by evaporation during the mixing and granulation of the fire retarding agent and the fluid thermoplastic polymer in the granulating cylinder. Temperatures lower than 50° C. were found to be ineffective because of low evaporation rates and high vacuum requirements, while temperatures above 160° C. required very high heat source temperatures which caused degradations in some inactive parts of the granulating system.

I have found that a new and completely homogeneous granular thermoplastic fire retardant composition was formed by the method of this invention. This new composition was thermoplastic in that it softened and became pliable as temperature increased toward the melting point of the contained thermoplastic polymer even with high concentrations of fire retarding agents. It was surprising that these granules were suitable for melt blending with other thermoplastic polymers or plastics to impart fire retardancy to the thermoplastic polymers and plastics.

The best use found for the present invention is in the preparation of fire retarding concentrates. It was discovered than an improved method of preparing fire retardant concentrate granules from fire retarding agent powders and thermoplastic polymers could be achieved in a horizontal stationary granulating cylinder containing mixing elements mounted to a central shaft which rotates along the center line of the cylinder and which mixing elements mechanically fluidize materials contained in the cylinder by throwing them away from the wall and toward the center of the cylinder, forcing axial and radial flows simultaneously on the contained materials thereby forming granules. In this method, it was necessary to control particle size of the granules formed by operating chopping blades on a shaft mounted through and perpendicular to the side wall of the cylinder.

For the present method to be particularly effective in producing fire retardant concentrates, a fire retarding powder consisting of particles with diameters between 0.1 and 10 microns was required. This powder could be effectively used in amounts between 60 and 90 percent of the final fire retardant concentrate granules. It was necessary that this fire retarding powder be mixed in the granulating cylinder with a molten thermoplastic polymer at a temperature between 110° and 220° C. until a homogeneous fluid mixture of the fire retardant powder and the thermoplastic polymer was formed.

Then granulation could be achieved by cooling the fluid mixture of powder and polymer to a temperature less than the solidification temperature of the thermoplastic polymer. It was necessary that the mixing elements and the chopping blades continue to operate in the cylinder, thereby forming and maintaining granules until the polymer solidified and bound the fire retarding powder together into homogeneous granules with a matrix of solidified polymer.

More specifically, an economically preferred method was found which used aqueous dispersions of thermoplastic polymers to form the matrices of fire retardant granules having properties of improved particle integrity. In this method, a horizontal stationary granulating cylinder is used which contains mixing elements mounted on a central shaft rotating tangentially inside the cylinder at a peripheral speed between 200 and 1000 feet per minute to throw the materials contained in the cylinder toward the center of the cylinder and forcing axial and radial flows simultaneously on the contained material and mechanically fluidizing it. The granulating cylinder is equipped with one or more chopping blades operating perpendicularly to, and between, the mixing elements at a peripheral speed between 3000 and 6000 feet per minute. With the granulating cylinder operating, a finely divided solid fire retarding agent having particle diameters between 1 and 10 microns, and amounting to between 40 and 85 percent of the fire retardant concentrate granules, is mixed with an aqueous dispersion containing between 10 and 40 percent of a thermoplastic polymer at a temperature between 25° and 100° C. until a homogeneous aqueous fluid mixture of fire retarding agent and thermoplastic polymer is formed. Then, while the mixing elements and the chopping blades continue to operate, water from the fluid mixture of fire retarding agent and thermoplastic polymer is evaporated until water content is between 0 and 5 percent and the fluid mixture is solidified into homogeneous granules in which the fire retarding agent is bound together by a matrix of solidified thermoplastic polymer.

The water may be evaporated from the system by external heat sources, such as a steam jacket on the horizontal granulating cylinder, and is preferably removed under vacuum at absolute pressures of between 10 and 200 millimeters of mercury which may be created by simple water ring vacuum pumps, steam jets, or other conventional means.

To achieve the desired integrity of the fire retardant concentrate granules from the aqueous dispersions of thermoplastic polymers, it was found necessary to hold the temperature in the granulating cylinder during the evaporation and solidification between 80° and 200° C.

The preferred aqueous dispersions of thermoplastic polymers for use in the present method were found to be: polyolefin, polyamide, polyvinylidene chloride, polyester, polystyrene, polybutadiene, natural rubber latex, and polyurethane.

A wide variety of finely divided solid fire retarding agents could be successfully used with the aqueous dispersions in the instant method. The preferred solids were powders of melamine, melamine cyanurate, melamine phosphate, melamine terephthalate, zinc cyanurate, sodium borate, boric acid, halogenated phenols, and alumina trihydrate.

It was found that the homogeneous granular thermoplastic fire retardant concentrate composition prepared from the aqueous dispersions and the finely divided fire retarding agents by the instant method showed a high degree of particle integrity and improved melt blending with other thermoplastic polymers to impart fire retardancy thereto.

EXAMPLE 1

Example 1 demonstrates the two-step method of the present invention for preparing fire retardant thermoplastic polymer granules from fire retarding agents and thermoplastic polymers, using an aqueous dispersion of thermoplastic polymer to form a thermoplastic matrix around melamine cyanurate powder fire retarding agent.

The granules were prepared in a steam jacketed cylinder having a total internal volume of 130 liters. The cylinder was 70 centimeters long and fitted with 2 plows rotating tangentially, at 500 rpm, close to the inside wall of the horizontally oriented stationary cylinder. The plows were shaped and oriented to throw the contents of the cylinder away from the walls and toward the center of the cylinder. The cylinder was also fitted with a chopper on a shaft operating perpendicular to the internal wall of the cylinder at a speed of 3000 rpm, with the chopper blades describing a circle of 15 centimeters on the shaft entering the cylinder at the 3 o'clock position. The chopper consisted of 4 sharp blades attached to the shaft close to the inner wall of the cylinder.

The cylinder was equipped with a vacuum stack, two fluid injection nozzles and a solids addition port, all on the top side of the horizontal cylinder. The center bottom side of the cylinder was equipped with a quick opening solids discharge port.

To the cylinder were added, through the solids addition port, the ingredients listed as follows:

| Ingredients | lbs |
|---|---|
| Polyethylene aqueous dispersion, 30% polyethylene | 25.0 |
| Melamine Cyanurate, powder, median particle diameter 10 microns | 22.0 |
| TOTAL | 47.0 |

Steam was applied to the jacket of the cylinder with the plows and choppers operating. The mixing and heating was continued until the fluid mixture was homogeneous at a temperature of 70° C., well above the solidification temperature of the now thick fluid.

Operation of the plows and choppers was continued while steam pressure was increased on the jacket and vacuum was applied to the cylinder to produce an internal pressure of 130 millimeters mercury absolute in the cylinder. The temperature in the cylinder ingredients increased to 87° C.

After 22 minutes, moisture was almost completely removed, the solidification point of the mixture was higher than 100° C., and the cylinder contents had been shaped into semi-spherical granules having a narrow particle size range by the fluidizing actions of the plows and the chopper and by rolling along the walls of the vessel.

The vacuum was terminated and cooling water was applied and the granules, weighing 29.2 pounds, were discharged from the cylinder at a temperature of 60° C., well below the solidification temperature of the fire retardant granules.

The granules were screened with results shown as follows:

| U.S. Screen Mesh Size | Wt % |
|---|---|
| +4 | 6 |
| −4 +8 | 44 |
| −8 +14 | 41 |
| −14 +20 | 8 |
| −20 mesh | 1 |

Microscopic examination of cross sections of the granules showed them to be homogeneous, and chemical analyses showed that each particle size range contained 74.3 percent melamine cyanurate.

EXAMPLE 2

Example 2 demonstrates that the composition prepared by the method of this invention is an effective fire retardant, and may be readily melt blended with other thermoplastic polymers to impart fire retardancy.

Nylon-6, amounting to 200 pounds, containing no fire retarding additives, in the form of 2.5 mm×2.5 mm extruded pieces, was dry blended in a batch V-Blender with 25 pounds of the concentrated granules from Example 1. The blend was then continuously fed to a 30 mm Berstorff Twin Screw Melt Blender at a rate of 240 pounds per hour, using a length to diameter ratio of 33 to 1, 175 rpm, and a temperature range in the blender from 220° to 258° C.

The melt fluid was discharged through dies and solidified by stran cooling via brief water contact. The solid strans were chopped continuously to produce strong, lustrous particles 2.5 mm in diameter and about 2.5mm long, the final composition is listed as follows:

| Components | Wt % |
|---|---|
| Melamine Cyanurate | 8.2 |
| Polyethylene | 2.0 |
| Nylon-6 | 88.9 |
| TOTAL | 100.0 |

The blending of the concentrate with the nylon in the melt blender produced a homogeneous product with substantially the same physical properties as those of the untreated nylon.

The original nylon gave a UL-94 test rating of burning, while the melt blended product gave a UL-94 test rating of V-0, non burning.

EXAMPLE 3

This example demonstrates the method of the present invention using zinc cyanurate powder as the fire retarding agent and a low melting nylon polymer blend as the thermoplastic polymer.

The stationary horizontal granulating cylinder described in Example 1 was used in this example with the plows and choppers operating at the speeds indicated.

To the cylinder was added the dry ingredients as follows:

| Ingredients | lbs |
|---|---|
| Nylon Blend, melting point 106° C., 3 mm × 3 mm particles | 11.0 |
| Zinc Cyanurate | 41.0 |
| TOTAL | 52.0 |

Steam was applied to the jacket of the cylinder with the plows and choppers operating. Heating and mixing was continued until the mixture was fluid and homogeneous at a temperature of 140° C., well above the solidification temperature of the thick fluid.

After 10 minutes additional blending to assure homogeneity, cooling water was applied to the jacket of the cylinder to cool the fluid mixture to a temperature of 41° C., well below the solidification temperature of the mixture.

The contents of the cylinder were discharged from the bottom port of the cylinder as semi-spheroid granules with a narrow particle size range. Chemical analysis confirmed the charge composition of the product, and microscopic examination of the cross-sections of the granules showed them to be homogeneous in composition.

The granules were screened with the results shown as follows:

| U.S. Screen Mesh Size | Wt % |
|---|---|
| +4 | 8 |
| −4 +8 | 46 |
| −8 +14 | 39 |
| −14 +20 | 6 |
| −20 | 1 |

The granules were found to have a high degree of physical integrity, melt blended with other thermoplastics readily, and were rated V-0 when tested by the UL-94 test.

I claim:

1. A two-step method of preparing fire retardant thermoplastic polymer granules from fire retarding agents and thermoplastic polymers in a horizontal stationary granulating cylinder containing mixing elements mounted to a central shaft rotating along the center line of the cylinder which mechanically fluidizes materials contained in the cylinder by throwing them toward the center of the cylinder, forcing axial and radial flows simultaneously on the contained materials, thereby forming granules, the granulating cylinder being equipped with one or more chopping blades operating on a shaft mounted through and perpendicular to the side wall of the cylinder to control particle size of granules formed, the method comprising:

(a) mixing in the granulating cylinder a fire retarding agent, with a fluid thermoplastic polymer, at a temperature exceeding the solidification temperature of the polymer until a homogeneous fluid mixture of fire retarding agent and thermoplastic polymer is formed; and (b) solidifying the mixed fire retarding agent and thermoplastic polymer by cooling to a temperature less than the solidification temperature of the thermoplastic polymer, while the mixing elements and the chopping blades of the granulating cylinder operate, until the fire retarding agent is bound together in homogeneous granules by a matrix of solid thermoplastic polymer.

2. The method of claim 1 wherein the fire retarding agent is a finely divided solid exhibiting particle diameters between 1 and 50 microns.

3. The method of claim 1 wherein the fire retarding agent is one or more s-triazine compounds.

4. The method of claim 1 wherein the fire retarding agent is an alkali metal salt selected from the group consisting of phosphate, borate, polyphosphate, silicate, and combinations thereof.

5. The method of claim 1 wherein the amount of fire retarding agent amounts to between 5 and 90 percent of the weight of the fire retardant thermoplastic polymer granules.

6. The method of claim 1 wherein the fluid thermoplastic polymer exhibits a solidification temperature between 90° and 240° C.

7. The method of claim 1 wherein the fluid thermoplastic polymer is selected from the group consisting of polyolefins, polyphenyls, polyamides, polyfluorocarbons, polycarbonates, polyurethanes, polyethers, polyesters, and polyvinylidene chloride.

8. The method of claim 1 wherein the fluid thermoplastic polymer is an aqueous dispersion containing between 15 and 60 percent thermoplastic polymer and exhibiting a solidification temperature less than 60° C.

9. The method of claim 8 wherein the water is removed from the aqueous dispersion by evaporation during the mixing of the fire retarding agent and the fluid thermoplastic polymer in the granulating cylinder at a temperature between 50° and 160° C.

10. An improved method of preparing fire retardant concentrate granules from fire retarding agent powders and thermoplastic polymers in a horizontal stationary granulating cylinder containing mixing elements mounted to a central rotating shaft which throw materials contained in the cylinder toward the center of the cylinder, forcing axial and radial flows simultaneously on the contained materials thereby forming granules, the granulating cylinder being equipped with one or more chopping blades on a shaft mounted through and perpendicular to the side wall of the cylinder to control particle size in the granules formed, the method comprising:

(a) mixing in the granulating cylinder a fire retarding powder, exhibiting particle diameters between 0.1 and 10 microns and amounting to between 60 and 90 percent of the fire retardant concentrate granules, with a molten thermoplastic polymer at a temperature between 110° and 220° C. until a homogeneous fluid mixture of the retarding powder and the thermoplastic polymer is formed; and (b) granulating the fluid mixture of fire retarding powder and thermoplastic polymer by cooling to a temperature less than the solidification temperature of the thermoplastic polymer, while the mixing elements and the chopping blades continue to operate forming and maintaining granules until the polymer solidifies thereby binding the fire retardant powder together into homogeneous granules with a matrix of solidified polymer.

11. An improved method of preparing fire retardant concentrate granules exhibiting improved particle integrity from finely divided solid fire retarding agents and a thermoplastic polymer in an aqueous dispersion, in a horizontal stationary granulating cylinder containing mixing elements mounted on a central shaft rotating tangentially inside the cylinder at a peripheral speed between 200 and 1000 feet per minute to throw materials contained in the cylinder toward the center of the cylinder, forcing axial and radial flows simultaneously on the contained materials and mechanically fluidizing the materials, the granulating cylinder being equipped with one or more chopping blades operating perpendicularly to, and between, the mixing elements at a peripheral speed between 3000 and 6000 feet per minute, the method comprising:

(a) mixing in the granulating cylinder a finely divided solid fire retarding agent exhibiting particle diameters between 1 and 10 microns and amounting to between 40 and 85 percent of the fire retardant concentrate granules, with an aqueous dispersion containing between 10 and 40 percent of a thermoplastic polymer at a temperature between 25° and 100° C. until a homogeneous aqueous fluid mixture of fire retarding agent and thermoplastic polymer is formed; and (b) evaporating water from the fluid mixture of fire retarding agent and thermoplastic polymer while the mixing elements and the chopping blades continue to operate until water content is between 0 and 5 percent and the fluid mixture is solidified into homogeneous granules in which the fire retarding agent is bound together by a matrix of solidified thermoplastic polymer.

12. The method of claim 11 wherein the moisture is evaporated under vacuum at an absolute pressure between 10 and 200 millimeters of mercury.

13. The method of claim 11 wherein the temperature in the granulating cylinder during the evaporation and solidification is between 80° and 200° C.

14. The method of claim 11 wherein the thermoplastic polymer of the aqueous dispersion is selected from the group consisting of polyolefin, polyamide, polyvinylidene chloride, polyester, polystyrene, polybutadiene, rubber latex, and polyurethane.

15. The method of claim 11 wherein the finely divided solid fire retarding agent is selected from the group of powders of: melamine, melamine cyanurate, melamine phosphate, melamine terephthalate, zinc cyanurate, sodium borate, boric acid, halogenated phenols, and alumina trihydrate.

* * * * *